Patented July 15, 1941

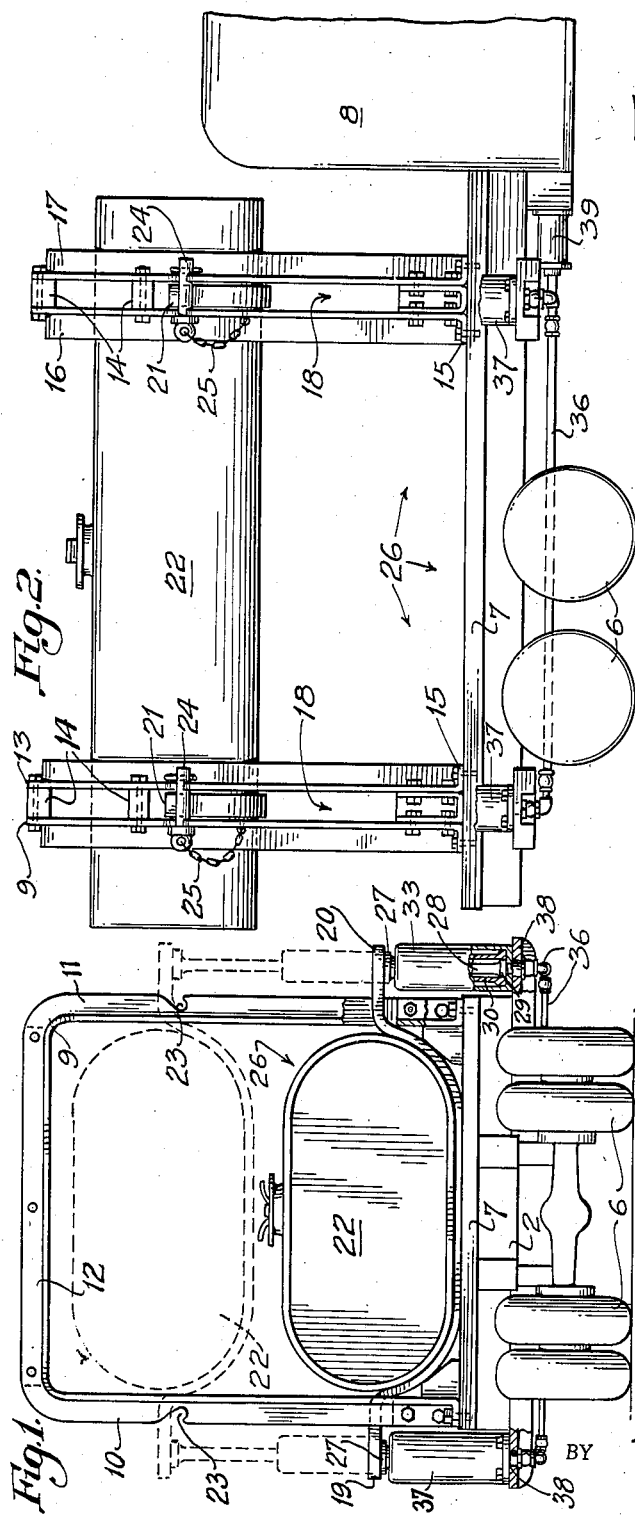

2,249,250

UNITED STATES PATENT OFFICE 2,249,250

COMBINATION HAULING DEVICE

Ernest T. Menard, Los Angeles, Calif.

Application January 16, 1940, Serial No. 314,043

6 Claims. (Cl. 280—5)

This invention relates to a combination truck which is arranged to carry more than one class of commodity or merchandise, for instance, a liquid in bulk and solids in bulk. The means for carrying these two classes of goods are so arranged so that the truck when loaded has a low center of gravity.

When the invention is applied to motor trucks for the hauling of oil in one direction and borax in an opposite direction so that a "pay load" is carried in both directions on long hauls. The oil tank is applied on the floor of the body of the truck when loaded with oil, for instance, when carrying oil out to the borax mines of California from coastal points. When the trucks arrive and empty the contents of the tank, the tank is elevated from the body of the truck and held in elevated position until a load of borax is placed in the cargo section on the floor of the truck. After the body of the truck is loaded with borax, the empty tank is then lowered to rest upon the top of the borax so as to keep the center of gravity as low as possible to the ground. At the place where the borax is unloaded, the tank is again elevated to clear the load and to permit removal of the load, or the same means for elevating the tank may be employed to elevate one end of the truck floor so that the load can be emptied by gravity from the truck body. By this arrangement, applicant has provided a double deck truck in which one of the decks (or both of them) can be elevated by any suitable means, such as hydraulic means operated by the engine of the truck.

The invention is not limited to trucks per se, but is readily adapted for use on truck trailers, and also for cargo carriers on railway systems. Even sea going vessels and river barges may be so equipped so that a paying load may be carried in both directions on long hauls.

An object of the invention is to provide means on cargo carriers so that they can carry two entirely different classes of goods on especially equipped decks, in which one or both of the decks can be elevated and/or tilted.

Another object is to provide cargo carriers with means to carry one class of goods in a holder best suitable for its transportation and another class of goods in another holder best suited for its transportation, in which one or both of the holders can be shifted in a manner that the truck when loaded is at its low center of gravity with respect to the ground.

Still another object is to present a cargo carrier which has means for carrying a load in bulk directly upon its floor boards and another load in an elevator type of container which is adapted to be rested upon the floor boards of the truck.

Other objects, advantages and features of my invention will appear from the accompanying drawing, the subjoined detailed description, the preamble of this specification and the appended claims.

Applicant is about to illustrate and describe one of the forms of his invention in order to teach one how to make, use and vend the same, but it is to be understood that the drawing and description thereof are not to limit the invention in any sense whatsoever, except as limited by the appended claims.

In the drawing:

Fig. 1 shows the invention in rear elevation, parts being broken away for the sake of clarity.

Fig. 2 shows the invention in side elevation.

Fig. 3 shows a plan view of the chassis of a motor truck, and

Fig. 4 shows a detail of the invention.

Fig. 5 is a longitudinal section of one of the cylinders of the invention.

Referring principally to Fig. 3 of the drawing, the numerals 1 and 2 indicate elongated runners of a truck chassis arranged in parallel as shown, and spaced apart at the forward end thereof by cross strips 3 and 4 which support the internal combustion engine 5 of a motor truck. The truck members 1 to 4 inclusive are shown as the general frame members to make up the chassis of the truck although it is to be understood that various of the braces and structural members are provided, but in view of the fact that chassis and engine and the various mechanisms necessary to drive the truck are not part of this invention, it is not believed necessary to show any of the structure. The chassis, of course, is provided with the usual front and steering wheels and rear truck wheels which are indicated in general by the reference character 6.

The rearward portion of the chassis is provided with a floor 7 of any suitable material which is securely fastened to the frame members 1 and 2 in any suitable manner such as by bolts and the like. Side boards may be built upon the floor, if desired. Forward of the midsection of the chassis is the usual driver's cab 8 provided with the usual seat and controls for driving the truck.

At the rear of the truck is a U-shaped frame work 9 made up of angle irons consisting of vertical legs 10 and 11 joined together at their tops by similar angle iron 12 which is spaced a short distance from another similar U-shaped frame 13 which also consists of vertical legs and join cross member like 10, 11 and 12 of the frame 9. These two frames 9 and 13 are rigidly held in space relation by spacers 14 through which pass bolts for securely holding the two frames together. The bottoms of the frames are flanged at 15, and provided with bolts which are securely fastened to the cross struts 7 of the body.

At the rear of the driver's cabin is another set of U-shaped frames 16 and 17 which are identical with the frames 9 and 13 just described and are rigidly spaced apart and anchored to the cross struts 7. Each frame is provided with a clear vertical slot section 18 to accommodate the horizontal arms 19 and 20 of strong cross strips 21, the arm 19 riding in the open slot along one side of each U-shaped frame and the other arm 20 riding in the opposite side of the U-shaped frame.

A liquid tank 22 rests upon the forward and rear strips 21 and is fixed thereto as by welding or by soldering and the like. Toward the tops of the legs forming the supporting frame for the tank are notched cut out portions 23 which are configurated to snugly engage the pins 24 which are linked to the supporting frame by chains 25. By this arrangement, the tank can be held in elevated position by placing the pins 24 in the cut-out portions 23 so that the pins lie beneath the arms 19 and 20 of the strips 21. When the tank is in such an elevated position, ample space 26 is provided between the truck floor and the tank 22 to carry any cargo desired.

The arms 19 and 20 of each strip extend well beyond the slots in the frame and have bolted or otherwise fixed thereto the head 27 of a piston 28. The lower end of the piston is provided with enlarged section 29 which snugly fits the bore of a cylindrical sleeve 30. The sleeve 30 is provided at its top with an inturned flange 31 to engage the piston end 29 and prevent same from being forced from the sleeve when in raised position, and the lower part of the sleeve 30 is provided with enlarged piston-like bottom 32 which snugly engages the bore of an outer cylinder 33. The top of the outer cylinder is also provided with inturned flange 34 to prevent the sleeve 30 from leaving the cylinder when forced outwardly. The bottom of the cylinder 33 is closed except for a small port 35 which is connected to a fluid pipe line 36. A similar hydraulic element 37 is provided either on the opposite side of each supporting frame making four in all so that the tank 22 can be elevated evenly at all points thereof. The hydraulic elements are supported by any suitable structural means extending from the chassis of the truck body as indicated at 38.

The pipe lines 36 all lead to a pump unit 39 which is operated from the drive shaft 40 of the engine. The drive shaft of the pump is connected to a counter shaft 41 through a clutch mechanism of any suitable type such as indicated by 42, and which is operated by a lever 43 convenient to the driver in the cab 8. The counter shaft 41 may be driven from the drive shaft of the engine 40 by any suitable means such as a belt or chain such as indicated by 44. Any suitable means may be provided for releasing the float pressure from the line 36 whenever it is desired to lower the tank 22. The hydraulic means for elevating the tank and lowering it may be of any type now common in the operation of hydraulic brakes for automobiles.

The drawing illustrations set forth a truck structure having lower and upper decks, the lower being the flat floor 7 and the upper, a tank 22. The upper deck need not necessarily be a tank to carry a fluid, it may instead be an open body designed to carry packages, etc., or any kind of bulk goods not requiring a tank.

Having thus described my invention, what is claimed as new and desired to be secured by Letters Patent is:

1. In a cargo carrier having a truck body for carrying general cargo, an elongated tank parallel with the body of the truck and resting upon same, means extending above the body along the sides thereof to provide a guide and support for the tank, arms extending from the sides of the tank and engaging said means, other means fixed to the body and engaging said arms for raising and lowering the tank.

2. The carrier recited in claim 1 wherein said first recited means include a plurality of U-shaped frames having legs with elongated slots to receive said arms.

3. The carrier recited in claim 1 wherein said other means includes a plurality of hydraulically controlled cylinders with pistons having their ends engaging the arms.

4. In a cargo carrier having a lading deck and a support therefor, guide means extending from the support above said deck, a housing for carrying liquids, means engaging the housing for raising and lowering it, said guide means comprise a plurality of frames having side legs joined across their tops by a bridge element, means on said housing engaging the legs of said frames so that the housing is guided to position when it is raised and lowered, and means on said frames for holding the housing in elevated position.

5. In a cargo carrier having a lading deck and a support therefor, a guide means extending from the support above said deck, a housing for carrying liquids, means engaging the housing for raising and lowering it, said guide means comprise a plurality of frames having side legs joined across their tops by a bridge element, means on said housing engaging the legs of said frames so that the housing is guided to position when it is raised and lowered, said second recited means comprising a plurality of hydraulic operative cylinders having pistons, and a plurality of saddle supports engaging said housing and having arms for connection with said pistons.

6. In a cargo carrier having a body for carrying cargo, a tank parallel with the body and resting upon same, rigid means fixed to the body sides and extending along the sides of the tank to guide it in vertical motion, arm means supporting the tank and slidable vertically in the rigid means, means for raising and lowering the arm means so that the tank can be laid upon the body or upon cargo in the body, said rigid means comprising inverted U-shaped frames, notched means on the frames to receive elements for holding the tank in raised position.

ERNEST T. MENARD.